March 11, 1969  E. G. McMAHON  3,432,373
METHOD OF FORMING A LAMINATE AND WINDING SAME INTO A ROLL
Filed Nov. 27, 1964
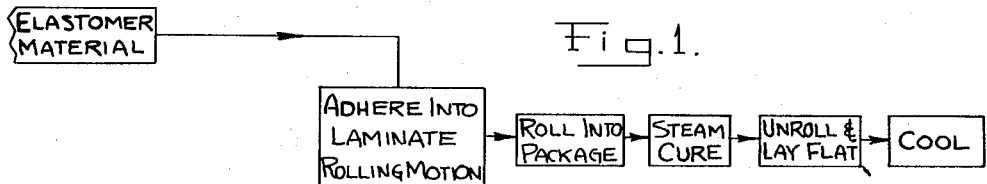
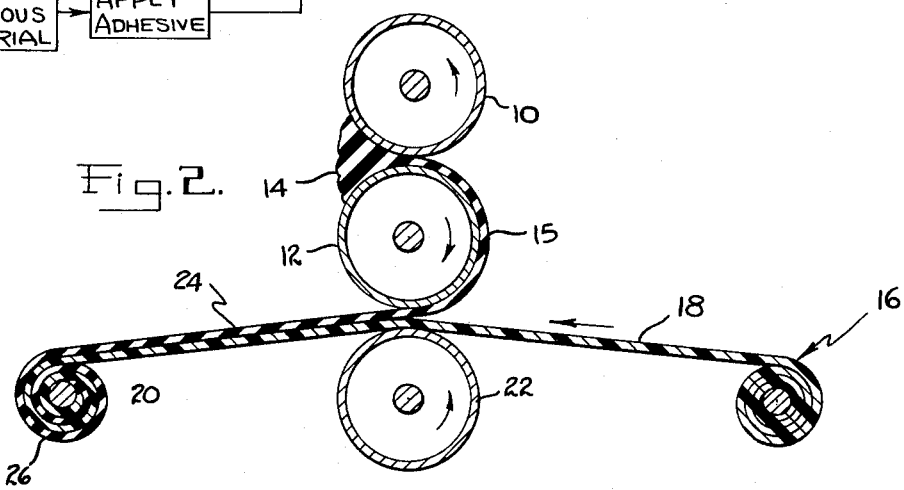
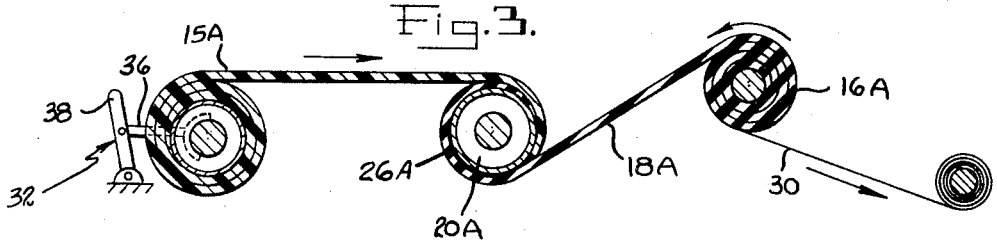
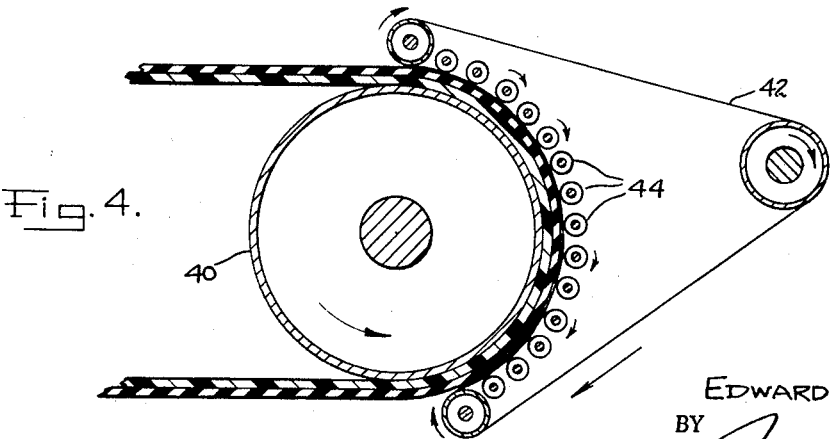
INVENTOR.
EDWARD G. McMAHON
BY
ATTORNEY United States Patent Office 3,432,373
Patented Mar. 11, 1969

3,432,373
METHOD OF FORMING A LAMINATE AND
WINDING SAME INTO A ROLL
Edward G. McMahon, Somerville, N.J., assignor to Johns-Manville Corporation, New York, N.Y., a corporation of New York
Filed Nov. 27, 1964, Ser. No. 414,385
U.S. Cl. 156—184
Int. Cl. B32b 27/06; B31c 13/00
10 Claims

ABSTRACT OF THE DISCLOSURE

A method of preparing a laminate having enhanced utility in which an etched synthetic resinous material such as polytetrafluoroethylene is chemically bonded by a thermosetting bonding agent such as, for example, the thermosettable adhesive solid by Shell Oil Company as Epoxy 919, which thermosettable bonding agent also chemically bonds with a curable elastomeric material such as an uncured or paritally cured rubber, the process including the steps of (a) sufficiently bringing together moving strips of each of the materials, (b) placing the thermosettable resin between the opposing faces of the materials, (c) applying sufficient pressure, to adhere the opposing faces but insufficient pressure to impair the permanent resiliency of the elastomer, and (d) thereafter curing the adhered lamina by typically employing calendering rolls and/or preferably post curing rolls of convolutions of the lamina by typically open steam curing.

This invention relates broadly to method and apparatus for preparing laminate material. More particularly, this invention relates to method for combining a lamina of synthetic resinous material and a lamina of elastomeric material. Still more particularly, this invention relates to method and apparatus for combining a lamina of rubber-like material and a lamina of polytetrafluoroethylene in a manner whereby the rubber retains its natural resiliency.

In formnig laminates of elastomeric material with synthetic resinous material, it is a general practice to subject the laminate to great pressures in a hydraulic press and a molding procedure which tends to reduce the natural resiliency of the elastomeric material. Because of the great pressures that are exerted during the molding procedure, the elastomeric or rubber-like material is necessarily condensed. Such molding procedures further limit the size of laminate that may be processed during a given time interval because of the limitation in the size of the molding press.

It is a primary object of this invention to provide method and apparatus whereby an infinite continuous length of synthetic resinous material and an infinite continuous length of elastomeric material may be processed and adhered together to provide an infinite continuous length of laminate in an uncompressed state.

It is another object of this invention to provide a more simple and facile method and apparatus for processing a lamina of synthetic resinous material and a lamina of elastomeric material to produce a laminated structure.

It is a further object of this invention to provide method and apparatus for simultaneously forming a lamina of elastomeric material and positioning the elastomeric lamina on a lamina of synthetic resinous material to reduce production time.

To accomplish the objects of this invention, a preferred embodiment comprises calendering a stock of elastomeric material between a pair of rolls, the bottom roll forming means for advancing the calendered lamina of elastomer material to a lamina of synthetic resinous material. The elastomeric material may be only partially or fully cured. A continuous length of synthetic resinous material, having a surface etched and coated with a suitable thermosetting adhesive, is provided on a roll for advancement between a pair of rolls and adhering with the elastomer lamina. In one of the preferred embodiments, the top roll of said latter pair of rolls is also the bottom roll of the pair of rolls employed to calender the elastomer material. Preferably, a calendered layer of elastomer .020 inch is adhered to a lamina of elastomer material of .020 inch between a pair of rolls, the nip between the rolls being no less than .039 inch. A powered take-up roll is provided to advance the laminate material as it is formed. The resinous material is maintained under tension between the roll being unwound and the take-up roll. After the laminate is rolled on the mandrel into a package, the package is positioned in an autoclave or other suitable steam curing chamber wherein the laminate is subjected to open steam in the range of 60–80 pounds pressure to cure the thermosettable adhesive and to complete the cure of the elastomeric material. The package is then removed, unrolled to lay flat, and cooled. The phrase "open steam" in this specification and the appended claims is intended to cover treatment by steam without the addition of mechanical pressure employed in confined molding presses and the like.

Other objects and advantages of the invention will become apparent during the course of the following description when taken in connection with the accompanying drawings in which:

FIG. 1 is a schematic flow chart of the process of this invention;

FIG. 2 is a schematic representation of apparatus for laminating an elastomer material onto a synthetic resinous material whereby the elastomer material is calendered directly onto the resinous material;

FIG. 3 is a schematic representation of apparatus whereby a previously calendered continuous length of elastomer material is unwound and combined with the continuous resinous material for rewinding and combining on a winding mandrel; and FIG. 4 is a schematic representation of apparatus where an elastomer lamina is combined with a resinous lamina to form a laminate as formed by pressure exerted by an endless belt and cured by means of a heated drum.

The present invention may be used in the formation of laminates from a combination of various materials such as those which may be classified as elastomer and those which may be classified as synthetic resinous materials. In the present case, the invention will be described in connection with a laminate formed from polytetrafluoroethylene and rubber.

Referring to FIG. 2 there is shown a pair of calendering rolls 10 and 12 to which rubber stock material 14 which may be raw or only partially cured is fed to form lamina 15. There is also shown a supply roll 16 of fluorocarbon resinous material 18 in continuous sheet form which may be of infinitive length. Presently, sheets of polytetrafluoroethylene as long as 200 feet are available. The resinous material may be etched by any suitable method and have applied thereto a thermosettable adhesive, such as that designated and sold by the Shell Oil Company as Epoxy 919. The resinous sheet material is unwound and then rewound upon take-up roll 20. The rate of take-up is sufficient to maintain the resinous sheet material 18 intermediate the supply roll 16 and the take-up roll 20 under slight tension so that it lies in a substantially horizontal plane except for any slight deviation by roll 22. The spacing between rolls 12 and 22 is important in that they are not so close as to compress the elastomer or fluorocarbon sheets to an extent sufficient to impart permanent compression to the resultant laminate 24. The rolls 12 and 22 are only close enough together to insure that the two laminae 15 and 18 are adhered together. A typical spacing for adhering an elastomer lamina 15 having the thickness of .020 inch and a fluorocarbon lamina 18 having a thickness of .020 inch would be .039 inch. The rolls 10, 12 and 22 are conventional calendering rolls and are of a diameter, which is considered to be conventional, of 6 inches. A typical speed at which the rolls 12 and 22 may be rotated is in the order of 13 ft./min. After the laminae 15 and 18 are adhered together and wound up as a laminate roll 26, the laminate roll 26 is placed in an autoclave for a required length of time at a preferred pressure, depending upon the type of elastomer material being used and the total thickness of the built-up layers or laminates, to effect curing of the bonding agent and final curing of the elastomeric material. When curing laminate rolls incorporating conventional types of elastomeric material, for example nitrate or Buna N, and having a nominal built-up thickness of 2 inches or less, the curing may be conducted under the following pounds of steam versus time relations:

60 pounds steam for 1½ hours
70 pounds steam for 1 hour
80 pounds steam for ¾ hour Since the adhering step of the process is conducted under relatively continuous conditions, as opposed to step-by-step conditions employed in those processes where the laminate is formed by a molding operation, and the final curing of the elastomer 14 is conducted when the laminate 24 is in a relatively massive roll form 26, as opposed to a relatively small sheet stock, it becomes apparent that the instant process is more expeditious both in regard to expense and time.

When the end use of the laminate dictates that flat stock be produced, the rolled package is removed from the autoclave while the package is at a relatively elevated temperature, unrolled, laid flat, and cooled while in the flat state.

In FIG. 3 is illustrated an arrangement where a precalendered or formed elastomer sheet 18A of infinite continuous length may be combined with a fluorocarbon resinous sheet 15A. The convolutions of the elastomer 18A sheet are separated by a liner 30 to prevent the elastomer from adhereing to itself. Sufficient tension is provided at the powered take-up roll 20A to cause the fluorocarbon and elastomer material to adhere to each other. The tension may be suitably adjusted by providing suitable brake means 32 on feed roll 15A. For purposes of illustration, the brake means 32 is in the form of a shoe, link 36, and actuator lever 38. However, it is to be understood that any suitable means may be provided. After the laminate roll 26A is formed on the powered take-up roll 20A, the laminate roll 26A is placed in an autoclave for curing in the same manner as that disclosed and described in conjunction with FIG. 1.

FIG. 4 schematically illustrates a method for combining the fluorocarbon and elastomer material and curing the resultant laminate directly on a driven roll. The drum or roll 40 is associated with an endless steel belt 42 and idler rolls 44 for applying pressure to the laminate as it is formed adjacent to the driven roll 40. The driven roll is provided with suitable heating means for effecting the curing of the adhesive and/or final curing of the elastomer. Preferably, the speed of the roll 40 is adjusted so that the curing is effective during 180° rotation of the roll 40. In a preferred embodiment, the fluorocarbon resinous sheet is positioned so as to be contiguous to the heated roll when the sheet passes thereover in order to prevent undue sticking of the elastomer material to the roll 40. However, it will be understood that the elastomer may be positioned on the inside or contiguous to the driven roll if the driven roll is provided with suitable means to prevent adhering of the elastomer thereto. This may be accomplished by spraying the driven roll 40 with silicone or other suitable releasing agent.

Having provided a complete description of the invention in a manner to distinguish it from the prior art, and having provided a description of the best modes presently contemplated of carrying out the invention, the scope of patent protection to be granted is defined by the following claims.

What is claimed is:

1. A method for forming a substantially continuous laminated sheet of (A) synthetic resinous material comprising a lamina of etched synthetic resinous material and (B) a cured elastomer material, bonded together by a thermosettable adhesive composition, said method comprising (a) adhering said etched resinous material to a curable elastomer comprising coating at least one of said etched resinous material and said curable elastomer with a thermosettable adhesive composition and thereafter adhesively laminating said etched resinous material and said curable elastomer with said coated thermosettable composition to an extent (1) sufficiently to adhere into a resultant curable laminate but (2) insufficiently to compress said curable elastomer into a permanent compression, whereby said elastomer material retains its resiliency, and (b) curing at least a part of said laminate (1) sufficiently to cure said thermosetting resin whereby said etched resinous material is bonded to said curable elastomer, and (2) sufficiently to at least partially cure said curable elastomer.

2. A method according to claim 1, in which said lamina is polytetrafluoroethylene.

3. A method according to claim 2, comprising prior to said adhering, partially curing said curable elastomer, and in which said curing of said laminate comprises employing steam.

4. A method according to claim 2, in which said curing of said laminate comprises employing open steam at about 60 to 80 pounds of pressure for a period of about ¾ to about 1.5 hours, sufficiently to substantially completely cure said curable elastomer material.

5. A method according to claim 4, in which said steam pressure is under 70 pounds and is for a period of about one hour.

6. A method according to claim 2, in which said method includes, prior to said adhesively laminating, advancing each of said etched resinous material and said curable elastomer to pass over at least one calendering roll, and at least partially curing said elastomer on said calendering roll, and in which said adhesively laminating comprises applying a rolling force to said laminate, thereby moving said laminate in substantially the same direction as each of the advancing etched resinous material and the advancing curable elastomer.

7. A method according to claim 6, in which said rolling force comprises a second rotating surface, and in which said laminate is maintained in contact with said second rotating surface until the elastomer and the thermosettable bonding agent have been substantially completely cured.

8. A method according to claim 2, in which prior to said adhering said method comprises forming a polytetrafluoroethylene sheet into a continuous sheet of substantially infinite length, and etching a face of said polytetrafluoroethylene sheet.

9. A method according to claim 8, in which said curing includes feeding said resultant laminate onto a winding roll and winding said resultant laminate in a plurality of convolutions to form a roll of said laminate, and thereafter steam curing said roll of laminate.

10. The method as described in claim 9, which further comprises:
 (a) unrolling the steam cured laminate and cooling while it lies in a flat position.

References Cited
UNITED STATES PATENTS

| | | | |
|---|---|---|---|
| 2,945,773 | 7/1960 | Panagrossi et al. | 161—189 XR |
| 3,355,347 | 11/1967 | Habermann | 161—189 |
| 2,771,388 | 11/1956 | Rocky et al. | |
| 2,700,630 | 1/1955 | Bukey et al. | 156—231 XR |
| 3,032,815 | 5/1962 | Gerber | 156—231 XR |
| 2,649,134 | 8/1953 | Steinle | 156—242 XR |
| 2,705,691 | 4/1955 | Panagrossi et al. | 161—165 |
| 2,743,759 | 5/1956 | Snow et al. | 156—143 |

PHILIP DIER, *Primary Examiner.*

U.S. Cl. X.R.

156—231; 161—189; 117—111, 138.8